March 17, 1925.　　　　　　　　　　　　　　　　　1,530,234
S. B. CHAPMAN
AUTOMOBILE SIGNAL
Filed March 28, 1922

Inventor:
Samuel B. Chapman

Witness:
R. E. Weber

Patented Mar. 17, 1925.

1,530,234

UNITED STATES PATENT OFFICE.

SAMUEL B. CHAPMAN, OF MILWAUKEE, WISCONSIN.

AUTOMOBILE SIGNAL.

Application filed March 28, 1922. Serial No. 547,413.

*To all whom it may concern:*

Be it known that I, SAMUEL B. CHAPMAN, a citizen of the United States, and resident of Milwaukee, in the county of Milwaukee and State of Wisconsin, have invented certain new and useful Improvements in Automobile Signals; and I do hereby declare that the following is a full, clear, and exact description thereof.

The invention relates to automobile signals for indicating the movements of a car. It comprises a pair of signal lamps, means for clamping them spaced in relation to each other onto a tail light housing, and electrical leads cooperating with the signal lamps and the tail light and cooperating with a pair of switches disposed on a steering wheel, and a brake whereby the movement of one of said switches operates to illuminate one of the lamps, each switch being associated with its particular signal lamp for purposes of signalling a left or right turn. The depression of the brake pedal operates to illuminate both signal lamps.

The primary object of the invention is the provision of a structure which is readily adapted to be attached to a tail or parking light so that it is conveniently fixed to parts already on a machine. The arrangement is such that the signal lamps are immediately adjacent the tail light and have the appearance of being an integral part of the general structure of the tail light so that the appearance is especially pleasing to the eye and the general design is neat. The readiness of affixation of the signal lamps is an important advantage, making for economy of manufacture.

An object of the invention is the use of a minimum number of parts for the performance of important functions. Illumination of one lamp indicates a left turn, that of another a right turn, and the operation of both lamps indicates a stop. In order to signal "Go", both the lamps are extinguished, thus the provision of but two lamps is operative to produce four signals. The provision of merely two lamps for these purposes results in a simplicity of arrangement of the electrical leads. The fact that "Go" is indicated by the extinguishment of both lights makes for economy in operation inasmuch as there is no drain on the battery.

Preferably, the left signal lamp has a green lens and the right a white lens; thus, a white light may be used to illuminate the road back of the car to facilitate backing up. The signal lamp housing is provided with forward and rearward lenses whereby the signal is made visible both in front and rear.

With the above and other objects in view which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principles thereof, and in which:

Fig. 2 is an elevation at right angles to the direction in which Fig. 1 is taken.

Figure 1:
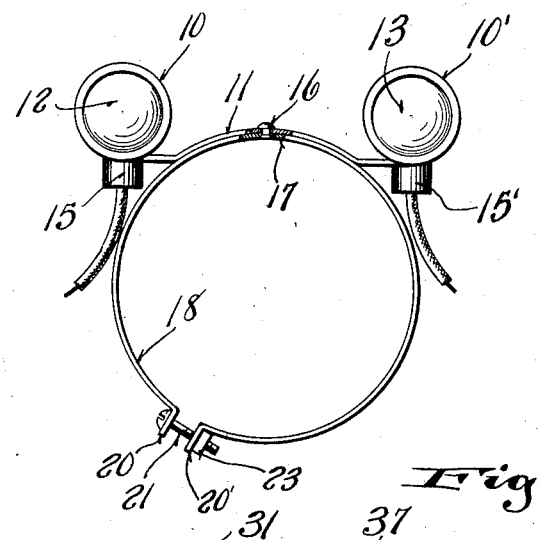
Fig. 1 is a side elevation of the device.
Figure 2:
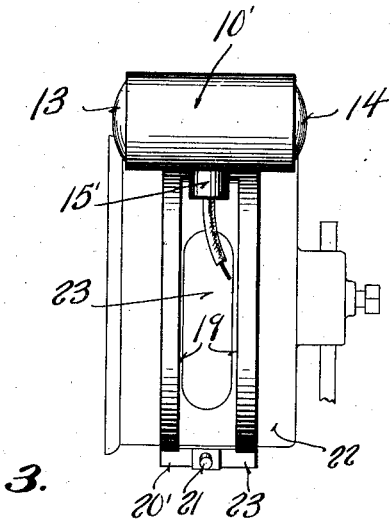
Figure 3:
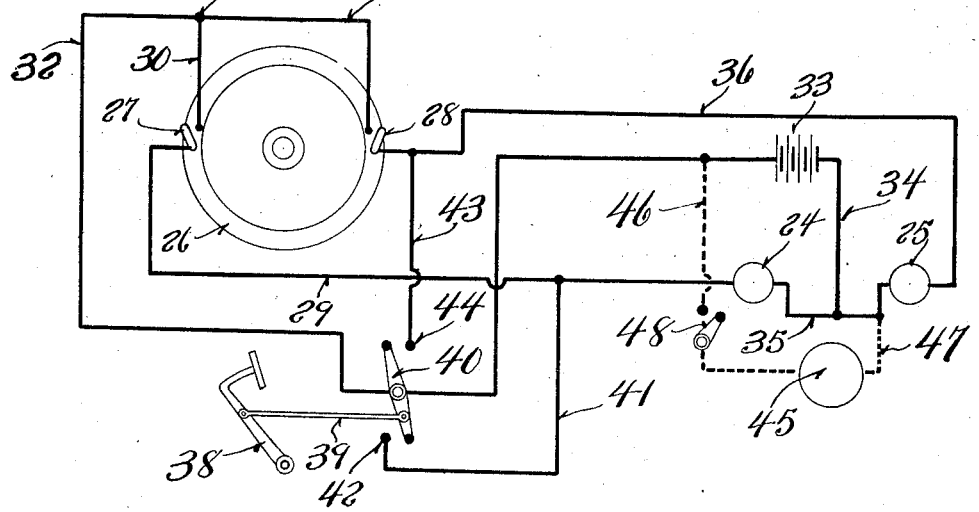

Fig. 3 is diagrammatic, illustrating the general arrangement of the electric system. The signal light housings 10, 10' are carried by the oppositely disposed arms of support 11. The housings are provided with lenses, housing 10 having a green lens 12 and housing 10' a white lens 13. The housings also carry forward lenses 14. Depending from the housings are tubes 15—15' thru which the leads are directed being associated with lamps in the housings. Support 11 is secured by rivet 16 to a clamp comprising an upper band 17 from which on each side a pair of parallel straps 18 and 19 are downwardly directed, terminating in ears 20, each of the ears being integral with a pair of straps. The ears are apertured to receive a bolt 21. The straps are adapted to envelop the cylindrical housing 22 of a standard tail light, and the adjusting of nut 23 secures the parts firmly in position. Housing 10 contains a left turn signal lamp 24 and housing 10' encases a right turn signal lamp 25. Steering wheel 26 is provided with a pair of switches 27 and 28. Switch 27 operates to make or break connection between lead 29 running to lamp 24 and lead 30, which at 31 connects with lead 32 running to battery 33, from which lead 34 runs to lead 35, connecting with lamps 24 and 25. Switch 28 operates to make or break connection between lead 36, running to lamp 25 and lead 37, which at 31 connects with lead 32.

Break pedal 38 operates thru link 39 to make or break connection thru switch 40 between lead 41 which connects with lead 29 and has a contact 42 at its end, and lead 43 which has a contact 44 at its end, lead 43 connecting with lead 36, so that when brake lever 38 is depressed, lead 32 connecting with switch 40 operates to illuminate lamps 24 and 25 which are in parallel. The depression of brake lever 38, by illuminating these lamps, operates to signal "stop." On the release of the brake, both lamps are extinguished. This signals "go". The illumination of lamp 24 alone by operation of switch 27, signals the left turn and the illumination of lamp 25 signals a right turn. Thus four distinct signals are produced by merely two lamps and battery 33 is operative thru the simple arrangement of leads described to illuminate all the lamps.

It is apparent that the device is easy to manufacture, being composed of simple parts of a minimum number and that when affixed to housing 22 of lamp 45, will have an ornamental appearance, looking as though it were an integral part of the tail lamp structure. The provision of forward and rearward lenses makes possible signaling forwardly and rearwardly, and a white lens 13 may be used when the machine is backed to illuminate the road in the rear of the automobile.

Lamp 45 is in circuit with battery 33 thru leads 46 and 47, and is controlled by switch 48.

I claim the following:

The combination of a conventional cylindrical tail light, of a pair of signal lights, a spacing bar secured to said signal lights, an annular strap secured to said spacing bar and adapted to fit over the cylindrical portion of said tail light, and means for drawing the ends of said strap towards each other, said strap having an opening adapted to align with the usual side opening in the said conventional tail light.

In testimony that I claim the foregoing I have hereunto set my hand at Milwaukee, in the county of Milwaukee and State of Wisconsin.

SAMUEL B. CHAPMAN.